Aug. 22, 1950 W. HAYWOOD, JR 2,519,653
AUTOMATIC CLAMPING AND SPACING DEVICE
Filed May 27, 1949 2 Sheets-Sheet 1
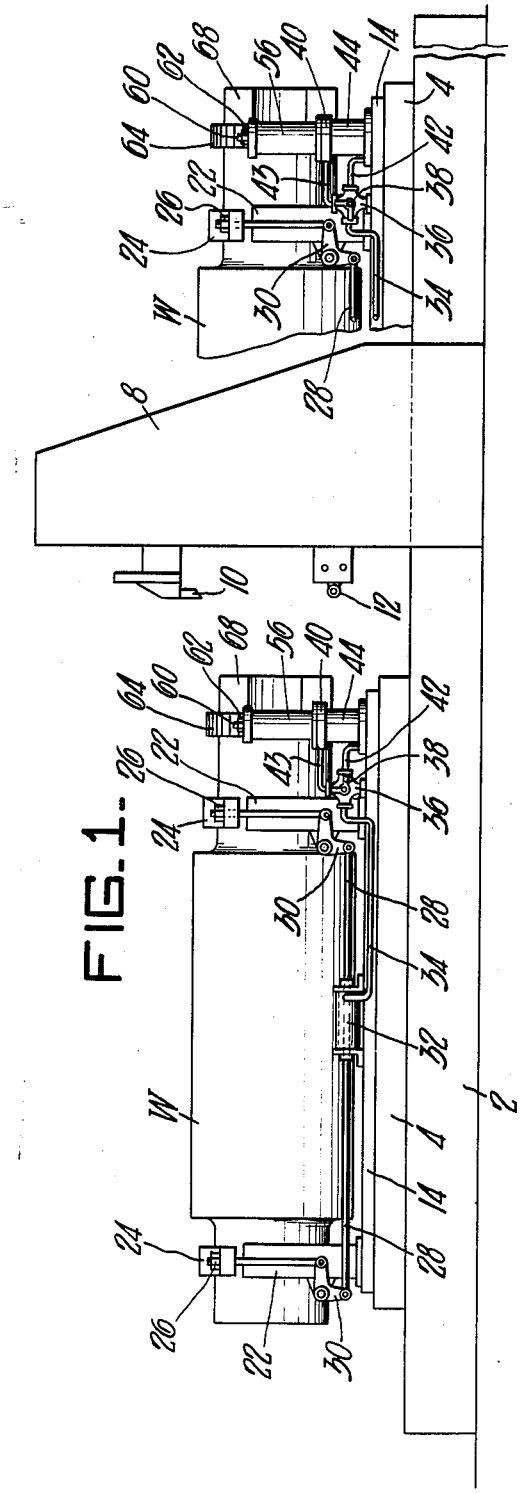
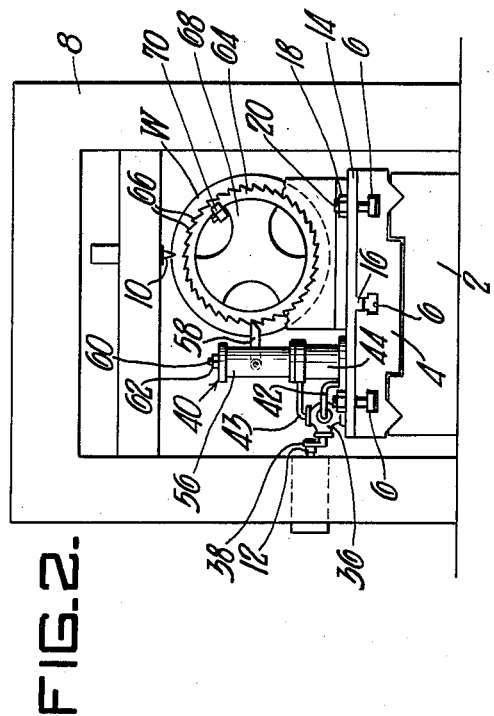
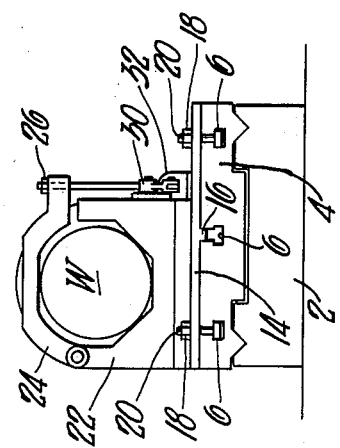
*Inventor:*
WILLIAM HAYWOOD, JR.,
by: Donald G. Dalton
his Attorney.

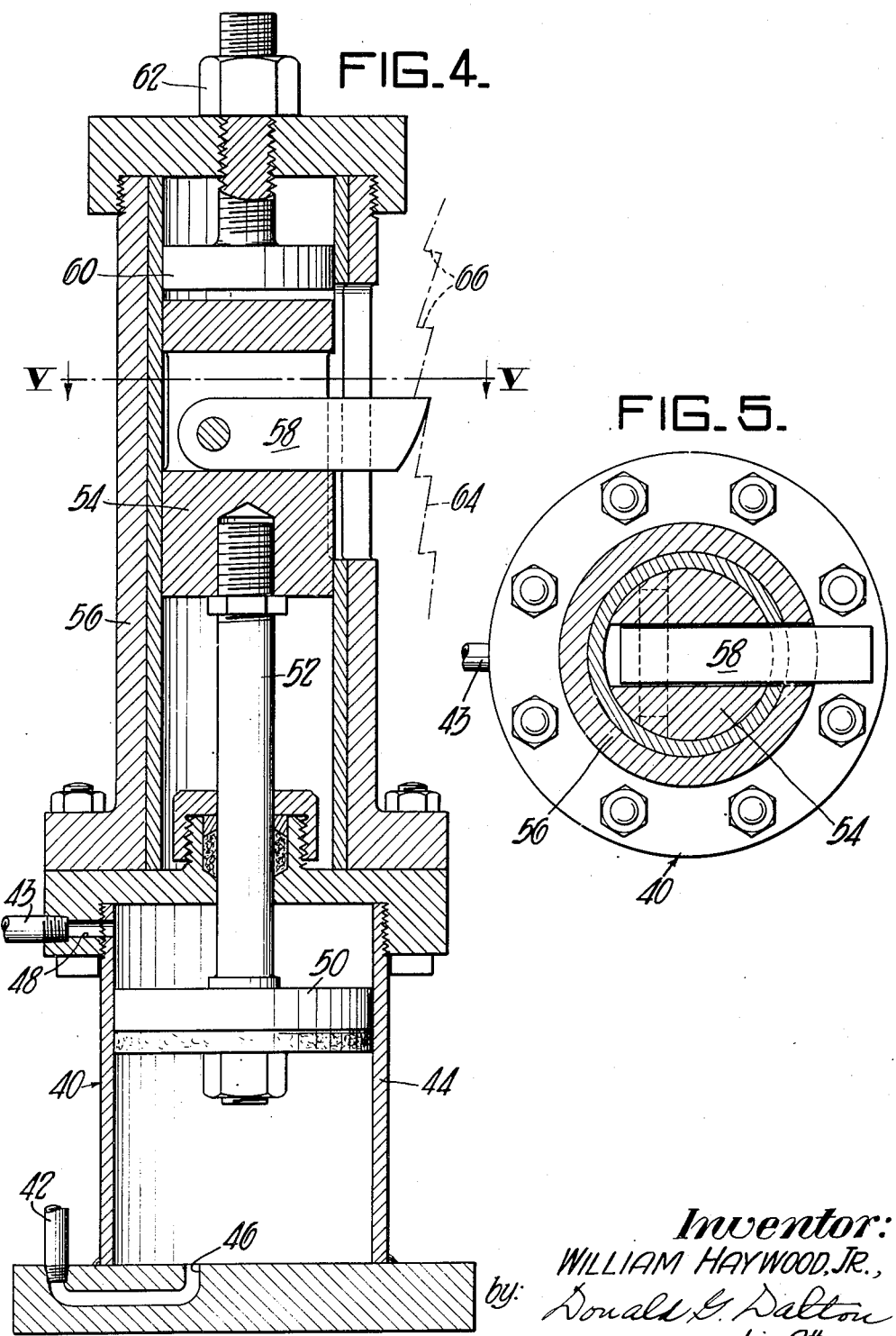

Patented Aug. 22, 1950

2,519,653

UNITED STATES PATENT OFFICE 2,519,653

AUTOMATIC CLAMPING AND SPACING DEVICE

William Haywood, Jr., Birmingham, Ala.

Application May 27, 1949, Serial No. 95,793

7 Claims. (Cl. 90—59)

This invention relates to a work-holding attachment and more particularly to an automatically operable clamping and spacing device especially suitable for alternately holding and indexing a cylindrical workpiece while said workpiece is being machined on a machine tool having a reciprocating table.

For purposes of illustration, the invention is shown as used in the grooving of a plate mill scale breaking roll which is usually 24" in diameter and has a face 110" long. Prior to my invention, the uniform grooving of the roll face of this roll in lines parallel to its longitudinal axis presented a machining problem of considerable magnitude. The grooving was accomplished by a slow, cumbersome method on a planer. The roll was placed on the planer table, aligned, levelled and manually clamped into proper position with the roll necks supported in bearing blocks. A groove was then cut in the roll face by normal operation of the planer. After the first groove had been cut, the holding clamps were loosened and, by manual manipulation, the roll was indexed and clamped in position for the next groove cut. This method was costly and time consuming. Inaccurate cuts were frequent since the manual manipulation necessary to index the roll for each groove cut made it difficult for the operator to properly position the workpiece so that misalignment of the grooves often occurred.

It is, accordingly, an object of my invention to provide an automatic clamping and spacing device which is suitably rugged in construction and inexpensive to manufacture.

Another object of my invention is to provide a clamping and spacing device which operates automatically to index and hold a cylindrical workpiece in proper position for machining on a reciprocating machine tool.

These and other objects will be more apparent after referring to the following specification and attached drawings, in which:

Figure 1 is a front elevational view showing the apparatus of my invention mounted on a planer table beginning its cutting stroke to the right and also a fragmentary view showing the changed position of the valve-operating lever at the end of the cutting stroke;

Figure 2 is a view of the right end of Figure 1;

Figure 3 is a view of the left end of Figure 1;

Figure 4 is a vertical sectional view of the air indexing jack of the invention; and Figure 5 is a cross sectional view taken on the line V—V of Figure 4.

Referring more particularly to the drawings, reference numeral 2 indicates a conventional closed-side planer having a reciprocating planer table 4 provided with T slots 6. A conventional planer side head tool post 8 is attached to and projects upwardly from planer 2. A cutting tool 10 is affixed to tool post 8. A stationary roller 12 is attached to the tool post below the cutting tool 10.

The apparatus thus far described is conventional except for the novel clamping and spacing device which is carried by the reciprocating planer table 4 and which will now be described.

Reference numeral 14 indicates a base plate having a tongue 16 projecting from the underside thereof. The base plate 14 is carried by the planer table 4 and automatically aligned thereon by means of tongue 16 which fits into one of the T slots 6. Base plate 14 is maintained in fixed position after alignment by nuts 18 and bolts 20, the heads of which fit into the T slots 6. A pair of spaced apart chucks 22 is attached to the base plate to support the ends of a cylindrical workpiece W which I have shown as a rolling mill roll.

Each of the chucks 22 is provided with a locking hinged clamp 24. Nuts 26 are provided to adjust the hinged clamps according to the end diameter of the workpiece to be machined. The clamps 24 are actuated by piston rods 28 through bell crank levers 30. Piston rods 28 project from the ends of a double-acting air cylinder 32. An air line 34 extends between and connects together cylinder 32 and a four-way valve 36 having an operating lever 38 attached thereto. An air indexing jack 40 is mounted on base plate 14 adjacent valve 36. An air line 42 connects the valve and the indexing jack. Another air line 43 extends between air cylinder 32 and indexing jack 40. The bottom portion of the air indexing jack comprises a vertical air cylinder 44 having a bottom air port 46 communicating with air line 42 and a top air port 48 which communicates with air line 43. A piston 50 is slidingly mounted within cylinder 44. A piston rod 52 projects from piston 50 upwardly out of cylinder 44. A plunger 54 is mounted on the free end of rod 52. Plunger 54 fits slidingly in the portion of housing 56 of the air index jack which projects above the air cylinder portion 44. A ratchet pawl 58 is pivotally mounted within housing 56 and extends outwardly therefrom, as shown in Figures 4 and 5. The pawl is adapted to be pushed upwardly by plunger 54 when piston 50 is forced upwardly by pressure air introduced into cylinder 44 through air port 46. The upward travel of pawl 58 is limited by stop 60 which is adjustably fitted in the top of housing 56. Stop 60 is adjusted upwardly or downwardly by means of an adjusting nut 62.

A ratchet wheel 64 having teeth 66 around its circumference is fastened on the wobbler end 68 of the neck of roll W. As shown in Figure 2, ratchet wheel 64 is mounted adjacent air index jack 40 in such a manner so that pawl 58 can readily engage the notched circumference of the ratchet wheel. The ratchet wheel is fastened on the roll neck in a conventional manner by means of set screws. A driving lug 70 is attached to and projects inwardly from the inner circumference of the ratchet wheel and engages the wall of one of the cut-out portions of wobbler end 68 to move the roll in the indexing operation.

In operation, the base plate 14 is placed on the reciprocating planer table 4 and aligned by fitting tongue 16 into the proper slot 6 and then secured by means of nuts and bolts 18 and 20. The hinged clamps 24 are opened and the roll W is placed in position with its necks supported in the chucks 22. The hinged clamps 24 are then closed but not tightened into clamping position. Ratchet wheel 64 is fastened around the wobbler end 68 of the roll neck with the lug 70 in driving position. The planer is started and the reciprocating table 4 now begins its stroke to the right toward the planer tool post 8. As the planer table moves in this direction, the valve-operating lever 38 engages the stationary roller 12 and is moved 90° to reverse the four-way valve 36. This admits pressure air into air cylinder 32 which causes the piston rods 28 to be thrust to the left, as seen in Figure 1, thereby tightening the hinged clamps 24 into clamping position by means of the bell crank levers 30. At the same time, pressure air is admitted into the air cylinder 44 of the air indexing jack 40 by means of air line 43 and air port 48, thereby forcing the piston 50 and piston rod 52 downwardly to lower the ratchet pawl 58. The cutting tool 10 then cuts the groove as the planer table continues its movement to the right.

As the planer table moves to the left on its return stroke the valve-operating lever 38 again engages the stationary roller 12 and is turned 90° to reverse the four-way valve 36. This exhausts the air from air cylinder 32 causing the piston rods 28 to move to the right which action releases the hinged clamps 24 from the roll necks. At the same time, air is released from the valve 36 and admitted into the cylinder 44 of the indexing jack 40 through air line 42 and air port 46. This causes piston 50 and piston rod 52 to move upwardly so that plunger 54 raises the ratchet pawl 58. As the ratchet pawl is moved upwardly it engages a tooth 66 on the circumference of the ratchet wheel 68 and thus indexes or turns the roll one notch. The upward movement of the ratchet pawl 58 is limited to one notch of the ratchet wheel by the stop 60.

The above described procedure is repeated for each groove cut into the roll face.

Although the invention has been described as used in grooving a roll on a planer, it is to be noted that it can be used on any machine tool having a reciprocating movement, for the purpose of clamping and spacing cylindrical stock while said stock is being machined.

While one embodiment of my invention has been shown and described it will be apparent that other adaptations and modifications may be made without departing from the scope of the following claims.

I claim:

1. A work-holding attachment for alternately clamping and indexing a cylindrical workpiece on a reciprocating machine-tool table comprising a base plate adapted to be secured to the table, spaced chucks on said base plate adapted to receive and support the workpiece, each of said chucks including a clamp for securing a workpiece therein, common means for actuating said clamps to cause them to grip and release the workpiece successively, said means including a double-acting fluid pressure cylinder having a piston rod projecting from each end thereof, and a bell crank lever attached to each of said clamps, said piston rods each being connected at the free end thereof to one of said bell crank levers, a pawl adapted to engage a ratchet wheel secured to the workpiece to index it in the chucks when the clamps are released, pawl-actuating means mounted on said plate, and control means for said clamp-actuating means and said pawl-actuating means operated by reciprocation of the table.

2. A work-holding attachment for alternately clamping and indexing a cylindrical workpiece on a reciprocating machine-tool table comprising a base plate adapted to be secured to the table, spaced clamping chucks on said base plate adapted to receive and support the workpiece, means for actuating said chucks to cause them to grip and release the workpiece successively, a fluid pressure idexing jack mounted on said base plate having a pivotally mounted pawl projecting therefrom adapted to engage a ratchet wheel secured to the workpiece to index it in the chucks when they are released, and control means for said chuck-actuating means and said fluid pressure indexing jack operated by reciprocation of the table.

3. A work-holding attachment as defined in claim 2 characterized by said fluid pressure indexing jack including a vertical fluid pressure cylinder having a piston rod projecting therefrom for actuating said pawl.

4. A work-holding attachment for alternately clamping and indexing a cylindrical workpiece on a reciprocating machine-tool table comprising a base plate adapted to be secured to the table, spaced clamping chucks on said base plate adapted to receive and support the workpiece, means for actuating said chucks to cause them to grip and release the workpiece successively, a fluid pressure indexing jack mounted on said base plate having a pivotally mounted pawl projecting therefrom adapted to engage a ratchet wheel secured to the workpiece to index it in the chucks when they are released, said indexing jack including a vertical fluid pressure cylinder, a piston rod projecting upwardly therefrom slidingly mounted within said fluid pressure cylinder, said piston rod projecting upwardly from said fluid pressure cylinder, and a plunger mounted on the free end of said piston rod adapted to raise said pawl when the piston rod is moved upwardly, and control means for said chuck-actuating means and said fluid pressure indexing jack operated by reciprocation of the table.

5. A work-holding attachment for alternately clamping and indexing a cylindrical workpiece on a reciprocating machine-tool table comprising a base plate adapted to be secured to the table, spaced chucks on said base plate adapted to receive and support the workpiece, each of said chucks including a clamp for securing a workpiece therein, common means for actuating said clamps to cause them to grip and release the workpiece successively, a fluid pressure indexing jack mounted on said base plate having a pivotally mounted pawl projecting therefrom adapted to engage a ratchet wheel secured to the workpiece to index it in the chucks when the clamps are released, said indexing jack including a vertical fluid pressure cylinder, a piston having a piston rod projecting upwardly therefrom slidingly mounted within said fluid pressure cylinder, said piston rod projecting upwardly from said fluid pressure cylinder, and a plunger mounted on the free end of said piston rod adapted to raise said pawl when the piston rod is moved upwardly, and control means for said clamp-actuating means and said fluid pressure indexing jack operated by reciprocation of the table.

6. A work-holding attachment for alternately clamping and indexing a cylindrical workpiece on a machine tool having a reciprocating work table and a stationary tool post comprising a base plate adapted to be secured to said table, a pair of spaced chucks on said plate adapted to receive and support the workpiece, each of said chucks including a hinged clamp for securing a workpiece therein, common means for actuating said hinged clamps to cause them to grip and release the workpiece successively, said means including a double-acting fluid pressure cylinder having a piston rod projecting from each end thereof, and a bell crank lever attached to each of said clamps, said piston rods each being connected at the free end thereof to one of said bell crank levers, a fluid pressure indexing jack mounted on said plate having a pivotally mounted pawl projecting therefrom adapted to engage a ratchet wheel secured to the workpiece to index it in the chucks when the hinged clamps are released, said indexing jack including a vertical fluid pressure cylinder having fluid ports in the upper and lower ends thereof, a piston having a piston rod projecting upwardly therefrom slidingly mounted within said fluid pressure cylinder, said piston rod projecting upwardly from said vertical fluid pressure cylinder, and a plunger mounted on the free end of said piston rod adapted to raise said pawl when the piston rod is moved upwardly, a valve member having an operating lever attached thereto mounted on said base plate adjacent said indexing jack, fluid pressure lines connecting said valve with the double-acting fluid pressure cylinder and with the lower fluid port in said indexing jack, said valve being adapted to control the operation of the double-acting cylinder to actuate said hinged clamps and to control the operation of said indexing jack to actuate said pawl, and a stationary roller mounted on said planer tool post and projecting therefrom into the path of travel of said valve-operating lever, said roller being adapted to engage said lever to operate said valve as the reciprocating table carries the work-holding attachment past the tool post.

7. A work-holding attachment for alternately clamping and indexing a cylindrical workpiece on a reciprocating machine-tool table comprising a base plate adapted to be secured to the table, spaced chucks on said plate adapted to receive and support the workpiece, each of said chucks including a clamp for securing a workpiece therein, means for actuating said clamps to cause them to grip and release the workpiece successively, said clamp-actuating means comprising a double-acting fluid pressure cylinder having a piston rod projecting from each end thereof and a bell crank lever attached to each of said clamps, said piston rods each being connected at the free end thereof to one of said bell crank levers, a pawl adapted to engage a ratchet wheel secured to the workpiece to index it in the chucks when said clamps are released, pawl-actuating means mounted on said plate, and control means for said clamp-actuating means and said pawl-actuating means operated by reciprocation of the table.

WILLIAM HAYWOOD, Jr.

REFERENCES CITED

The following references are of record in the file of this patent:

UNITED STATES PATENTS

| Number | Name | Date |
| --- | --- | --- |
| 1,421,116 | Woodward | June 27, 1922 |
| 1,938,770 | Archea | Dec. 12, 1933 |
| 2,404,161 | Bower | July 16, 1946 |